United States Patent [19]

Huang et al.

[11] Patent Number: 4,762,596
[45] Date of Patent: Aug. 9, 1988

[54] PROCESS FOR REMOVAL OF HYDROGEN HALIDES OR HALOGENS FROM INCINERATOR GAS

[75] Inventors: Hann S. Huang, Darien; Norman F. Sather, Naperville, both of Ill.

[73] Assignee: The United States of America as represented by the United States Department of Energy, Washington, D.C.

[21] Appl. No.: 87,835

[22] Filed: Aug. 21, 1987

[51] Int. Cl.$^4$ ............................................... C25B 1/00
[52] U.S. Cl. ............................................................ 204/60
[58] Field of Search .................. 204/130, 131, 60, 61, 204/129, 59 R

[56] References Cited

U.S. PATENT DOCUMENTS

| Re. 31,718 | 10/1984 | Winnick et al. | 204/130 |
|---|---|---|---|
| 3,684,667 | 8/1972 | Sayce | 204/60 |
| 3,711,393 | 1/1973 | Garfingel | 204/130 |
| 3,926,753 | 12/1975 | Lee | 204/149 |
| 4,005,001 | 1/1977 | Pebler | 204/195 |
| 4,116,782 | 9/1978 | Bon | 204/147 |
| 4,222,833 | 9/1980 | Carlson | 204/128 |
| 4,265,714 | 5/1981 | Nolan et al. | 204/197 |
| 4,370,306 | 1/1983 | Hirchner et al. | 204/130 |
| 4,440,605 | 4/1984 | Hilbertz | 204/16 |
| 4,659,443 | 4/1987 | Byker | 204/131 |

OTHER PUBLICATIONS

"Cheap Way to Banish Dioxin" in New Scientist, Mar. 20, 1986.
"Burning Hazardous Waste" in Chemical Week, Oct. 5, 1983.

*Primary Examiner*—R. L. Andrews
*Attorney, Agent, or Firm*—William Lohff; Hugh W. Glenn; Judson R. Hightower

[57] ABSTRACT

A process for reducing the amount of halogens and halogen acids in high temperature combustion gases and through their removal, the formation of halogenated organics at lower temperatures, with the reduction being carried out electrochemically by contacting the combustion gas with the negative electrode of an electrochemical cell and with the halogen and/or halogen acid being recovered at the positive electrode.

7 Claims, 1 Drawing Sheet

PROCESS FOR REMOVAL OF HYDROGEN HALIDES OR HALOGENS FROM INCINERATOR GAS

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

With increasing restrictions on the use of landfills for waste disposal, incinerators have received greater acceptance as a means for reducing the volume of waste materials in addition to generating heat and/or power. In general, these incinerators are operated at elevated temperatures and produce combustion gases containing various pollutants which are usually reduced to acceptable levels before exiting through the stack to the atmosphere.

The levels and type of pollutants in the combustion gases prior to treatment and removal through the stack may vary depending on the combustion temperatures, type of fuels or waste materials being consumed, residence time of the waste materials in the incinerator, amount of air admitted to the combustion zone, and the procedures for adding the fuel to the incinerator. In some instances, higher temperatures in the order of 1000°–1200° C. are used for more complete combustion to reduce the levels of organics and partially oxidized organics in the combustion gases.

The formation of halogenated organics, free halogens and halogen acids are particularly a problem since many are toxic and/or corrosive. Examples of these substances are those containing chlorine, which are represented by the polychlorinated biphenyls (PCB), dioxins, chlorine gas and hydrogen chloride. At the higher temperatures, the combustion process can favor the formation of substantial amounts of chlorine and hydrogen chloride. With available hydrogen in the combustion process, chlorine is converted to hydrogen chloride which may be removed by the use of sodium carbonate, lime or a water spray. Removal of the hydrogen chloride in this manner may be accomplished with a scrubber.

However, both the toxic and corrosive nature of these halogen containing materials and their conversion to less objectionable products frequently involves problems. Combustion conditions and waste feed material may vary and cause changes in the amounts and type of the materials that are produced. Both halogens and halogen acids are corrosive and toxic and are not removed completely by the scrubbing operation. In addition, at lower combustion temperatures below about 700° C., halogen and halogen acids may react with trace amounts of organics remaining in the combustion gases to form toxic halogenated organics.

Accordingly, one object of this invention is a process for reducing pollutants in combustion gases. A second object of the invention is a process for reducing the amounts of halogens, halogen acids, and halogenated organics in combustion gases. An additional object of the invention is a process for reducing pollutants and particularly halogen-containing pollutants in combustion gases without adding treatment chemicals to the combustion gases. A further object of the invention is a process for reducing pollutants and particularly the halogen-containing pollutants with the use of equipment that does not result in a waste water stream or any other residual that requires chemical or other treatment for neutralization or removal of pollutants. A further object of the invention is a process for reducing pollutants and particularly halogen-containing pollutants in such a manner as to recover halogens for resale or other useful purposes. These and other objects of the invention will become apparent from the following detailed description.

SUMMARY OF THE INVENTION

Briefly, the invention is directed to a process for reducing the amount of free halogens and halogen acids in combustion gases and through their removal, reducing the amount of halogenated organics in the combustion gases. The process includes the steps of providing a combustion gas containing one or more halogens and/or halogen acids, reducing the amount of any free halogens and/or halogen acids in the combustion gases at a temperature above about 700° C., and cooling the gases to a temperature below about 700° C. for removal through a stack. Advantageously, the step of removing halogens and/or halogen acids is carried out by electrochemically separating the halogens and/or halogen acids selectively from the gas stream. Preferably, this is carried out by providing an electrolytic cell with a negative electrode, an electrolyte, and an anode with the cell having the capacity at the negative electrode to convert halogen and/or a halogen acid to a halide ion for transfer through the cell electrolyte; contacting the combustion gases with the negative electrode of the electrochemical cell; and transferring the halogen and/or halide of the halogen acid from the combustion gas through the negative electrode and the electrolyte (in the form of halide ions) to the anode at which free halogen is formed and collected.

The invention has a number of advantages. The process is carried out to remove the halogen and/or halogen acid at temperatures above those thermodynamically favoring reaction with organics to form halogenated organics. The process reduces the amount of halogen and/or halogen acid so that when the temperature is reduced to a value favoring the formation of halogenated organics, the major amount of the halogen reactant already has been removed. The process through the reduction of halogen and/or halogen acid causes the reduction in halogenated organics. Removal of the halogen and/or halogen acid is carried out selectively without the addition of chemical agents and without the use of equipment for neutralization, detoxification, or removal of the reaction products of the treatment.

DETAILED DESCRIPTION OF THE PREFERRED EMBODIMENT

Figure 1:
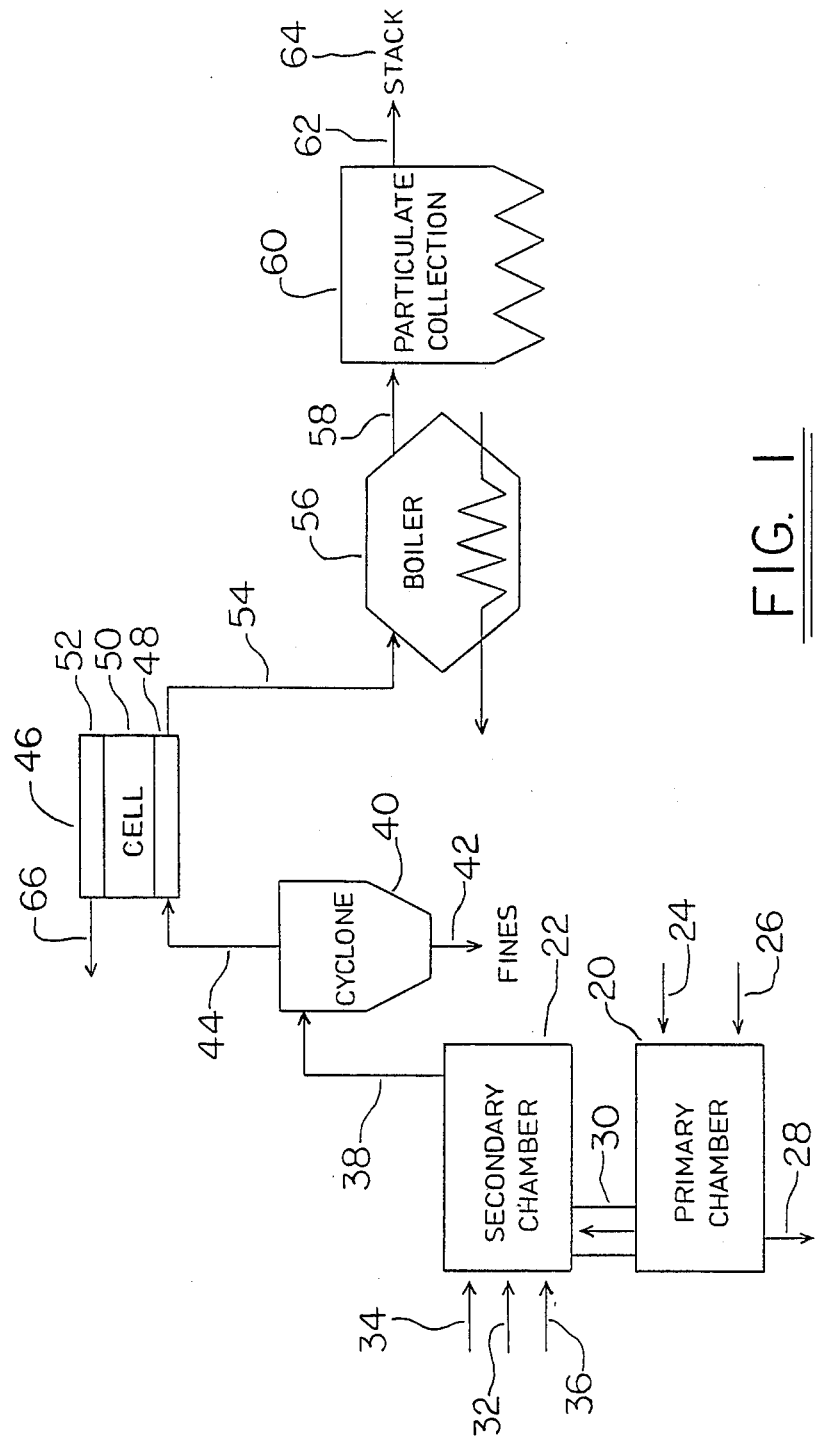
FIG. 1 is a schematic of a flow diagram for one embodiment of the invention.

In the inventive process, combustion gas containing one or more halogens and/or halogen acids with small amounts of residual organics is formed in a combustion process. The gas is subsequently treated electrochemically to remove the halogen(s) and the halogen acid(s) at temperatures above those favoring the formation of halogenated organics or above about 700° C. The combustion gas is then cooled to temperatures below about 700° C. for removal through a stack. During the cooling step, the formation of halogenated organics is inhibited by the lack of halogen and/or halogen acid. The electrochemical treatment is preferably carried out by contacting the combustion gas with the negative electrode of an electrochemical cell to form a halide ion, transferring the ion through the electrolyte to the anode, forming halogen gas at the anode, and collecting the pure halogen gas thus produced at the anode.

FIG. 1 represents an illustrative schematic of a process representing one embodiment of the invention. As illustrated, a primary combustion chamber 20 and secondary combustion chamber 22 are provided as a means of forming combustion gases at elevated temperatures. Solid waste is introduced through inlet 24 to chamber 20 with combustion air being introduced through inlet 26. The feed includes the typical waste materials containing various organic materials including halogenated organics from polyvinyl chloride, polytetrafluoroethylene, and other commercial plastics, in addition to cellulosic and petroleum-based organics. Combustion chamber 20 is also provided with an outlet 28 for ash removal.

In combustion chamber 20, the fuel is reacted with the air at a temperature of about 600°–800° C. to produce a first stage combustion gas. The combustion is completed in the combustion chamber 22 at a temperature of about 1000°–1200° C. The interconnection is provided by duct 30. As illustrated, combustion air, liquid waste and additional fuel are provided through lines 32, 34 and 36. The combustion of the fuels in chambers 20 and 22 is carried out at an efficiency of nearly 100% and provides a gas largely consisting of nitrogen, carbon dioxide, carbon monoxide, and oxygen. Trace constituents typically include HCl (500 to 30,000 ppm) and $Cl_2$ (10 to 500 ppm).

In the combustion process, gas at a temperature of about 1000°–1200° C. and containing one or more halogens and/or halogen acids together with some organic materials is provided from combustion chamber 22 and fed through line 38 to cyclone 40 where fines are removed through outlet 42. The combustion gas from cyclone is at a temperature above about 800° C. and more typically about 800°–1000° C. The gas is fed to line 44 which is connected to electrochemical cell 46. Contact between the gas and the negative electrode 48 results in a reduction in the content of halogen and/or halogen acid in the gas. In the electrochemical transfer of the halogen or halogen acid from the gas, a halide ion is formed at the negative electrode 48 and transferred through the electrolyte 50 to the anode or positive electrode 52 where halogen gas is formed and collected. Typically, the electrodes of cell 46 for chlorine removal are made of conductive metals or ceramics (e.g. ruthenium titanate or carbon) with the electrolyte being a single or mixed salt of metal halides (e.g., NaCl, LiCl and KCl) having a melting temperature range of about 300°–800° C. The operating temperature of the cell is about 800°–1000° C. and the applied voltage is about 1.5–2.0 volts. As illustrated, halogen gas is formed at the anode 52 and removed by line 66. Hydrogen may also be provided at the anode 52 to form a halogen acid.

The content of halogen and/or halogen acid in the combustion gas is reduced substantially by contact with the negative electrode 48 with the reduction being at least about 90 vol.% by a single cell and in the order of about 99 vol.% by a cascade of cells.

The combustion gas is then fed through line 54 to boiler 56 to generate steam and subsequently fed through line 58 to a particulate collector 60. The output from collector 60 is removed through line 62 to stack 64. The gas may also be further treated to reduce the temperature to a value below about 600° C. and more typically about 100°–200° C.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A process for reducing the level of one or more halogens and/or halogen acids in a combustion gas containing an organic pollutant, comprising the steps of:
   providing the combustion gas,
   providing an electrochemical cell having a negative electrode, an electrolyte, a positive electrode, and means for applying a voltage across the electrodes, and
   electrochemically reducing the amount of halogen and/or halogen acids in the combustion gas at a temperature above about 700° C. by contacting the combustion gas with the negative electrode to form a halide ion for transfer through the electrolyte to the positive electrode.

2. The process of claim 1 including the subsequent step of cooling the combustion gas to a temperature below about 700° C.

3. The process of claim 2 including the step of removing the combustion gas through a stack.

4. The process of claim 2 wherein the step of providing the combustion gas includes providing the gas containing chlorine and hydrogen chloride as the halogen and halogen acids, respectively.

5. The process of claim 4 wherein the step of providing the electrochemical cell provides an electrolyte of an alkali and/or alkaline earth metal salt or mixture thereof having a melting temperature between about 300°–800° C.

6. The process of claim 5 wherein the step of providing the combustion gas includes the step of reacting a fuel containing a halogenated organic with an oxidant gas to produce said combustion gas.

7. The process of claim 1 including the step of converting the halide ion at the positive electrode to a halogen and/or halogen acid, the halogen acid being formed by providing hydrogen at the positive electrode.

* * * * *